(12) United States Patent
Castillo et al.

(10) Patent No.: US 11,179,817 B2
(45) Date of Patent: Nov. 23, 2021

(54) TOOL FOR EXTRACTING SHIMS FROM A TURBOMACHINE

(71) Applicant: SAFRAN AIRCRAFT ENGINES MEXICO S.A DE C.V., Querétaro (MX)

(72) Inventors: Jorge Castillo, Hidalgo (MX); Mickael De Araujo, Santiago de Queretaro (MX); Yohannes Marcelet, Queretaro (MX)

(73) Assignee: SAFRAN AIRCRAFT ENGINES MEXICO S.A. DE C.V., Querétaro (MX)

( * ) Notice: Subject to any disclaimer, the term of this patent is extended or adjusted under 35 U.S.C. 154(b) by 498 days.

(21) Appl. No.: 16/087,457

(22) PCT Filed: Mar. 24, 2017

(86) PCT No.: PCT/IB2017/000296
§ 371 (c)(1),
(2) Date: Sep. 21, 2018

(87) PCT Pub. No.: WO2017/163122
PCT Pub. Date: Sep. 28, 2017

(65) Prior Publication Data
US 2019/0111530 A1    Apr. 18, 2019

(30) Foreign Application Priority Data
Mar. 24, 2016   (FR) ........................................ 1652571

(51) Int. Cl.
*B23P 19/02*   (2006.01)
*B25B 27/02*   (2006.01)
(Continued)

(52) U.S. Cl.
CPC ............ *B23P 19/025* (2013.01); *B25B 27/02* (2013.01); *B25B 27/023* (2013.01); *B23P 6/045* (2013.01); *B25B 19/00* (2013.01); *F05D 2230/70* (2013.01)

(58) Field of Classification Search
CPC ........ B23P 19/025; B23P 6/045; B25B 19/00; F05D 2230/70
See application file for complete search history.

(56) References Cited

U.S. PATENT DOCUMENTS

| | | | |
|---|---|---|---|
| 995,595 A * | 6/1911 | Hahn | ...................... B25B 27/26 29/217 |
| 1,538,721 A * | 5/1925 | Merdian | ............... B25B 27/023 29/259 |

(Continued)

FOREIGN PATENT DOCUMENTS

| DE | 103 44 098 A1 | 4/2005 |
|---|---|---|
| EP | 0 340 638 A1 | 11/1989 |

(Continued)

OTHER PUBLICATIONS

International Search Report as issued in International Patent Application No. PCT/IB2017/000296, dated Jun. 19, 2017.

*Primary Examiner* — Hadi Shakeri
(74) *Attorney, Agent, or Firm* — Pillsbury Winthrop Shaw Pittman LLP (57) ABSTRACT

An extraction tool for extracting a shim located in a turbomachine and provided with a through-hole, includes an extractor pin configured to be inserted into the through-hole of the shim; a first gripping member with a first distal end intended to be positioned opposite the through-hole on a first side of the shim and arranged to retain a first end of the extractor pin; and a second gripping member including a second distal end intended to be positioned opposite the through-hole on a second, opposite side of the shim, and
(Continued)

arranged to retain a second, opposite end of the extractor pin, after the extractor pin has been inserted into the through-hole of the shim.

11 Claims, 4 Drawing Sheets (51) Int. Cl.
*B25B 19/00* (2006.01)
*B23P 6/04* (2006.01)

(56) References Cited

U.S. PATENT DOCUMENTS

| | | | | |
|---|---|---|---|---|
| 2,525,316 | A * | 10/1950 | Schiff | E04H 17/261 |
| | | | | 173/91 |
| 4,060,884 | A * | 12/1977 | Hamilton | B25B 27/023 |
| | | | | 29/256 |
| 4,335,493 | A * | 6/1982 | Shivers, Jr. | B25B 27/02 |
| | | | | 29/254 |
| 8,127,417 | B1 | 3/2012 | Butler et al. | |
| 9,121,451 | B2 * | 9/2015 | Schweitzer | B25B 27/06 |
| 10,265,838 | B2 * | 4/2019 | Kolvick | F01D 11/005 |
| 2002/0166415 | A1 | 11/2002 | Sawyer et al. | |
| 2005/0100445 | A1 | 5/2005 | Anner et al. | |

FOREIGN PATENT DOCUMENTS

| | | | | |
|---|---|---|---|---|
| FR | 2 945 074 | A1 | 11/2010 | |
| GB | 2272180 | A * | 5/1994 | B25D 1/16 |
| WO | WO 01/15869 | A2 | 3/2001 | |

* cited by examiner

PRIOR ART

TOOL FOR EXTRACTING SHIMS FROM A TURBOMACHINE

CROSS-REFERENCE TO RELATED APPLICATIONS

This is the U.S. National Stage of PCT/IB2017/000296, filed Mar. 24, 2017, which in turn claims priority to French Patent Application No. 1652571, filed Mar. 24, 2016, the entire contents of all applications are incorporated herein by reference in their entireties.

TECHNICAL FIELD

The present invention generally relates to the field of turbomachines, such as turbofan engines. The invention more particularly relates to a tool for extracting shims in a turbomachine, such as shims arranged between a fan blade and the corresponding support disk.

STATE OF THE ART

Figure 1:
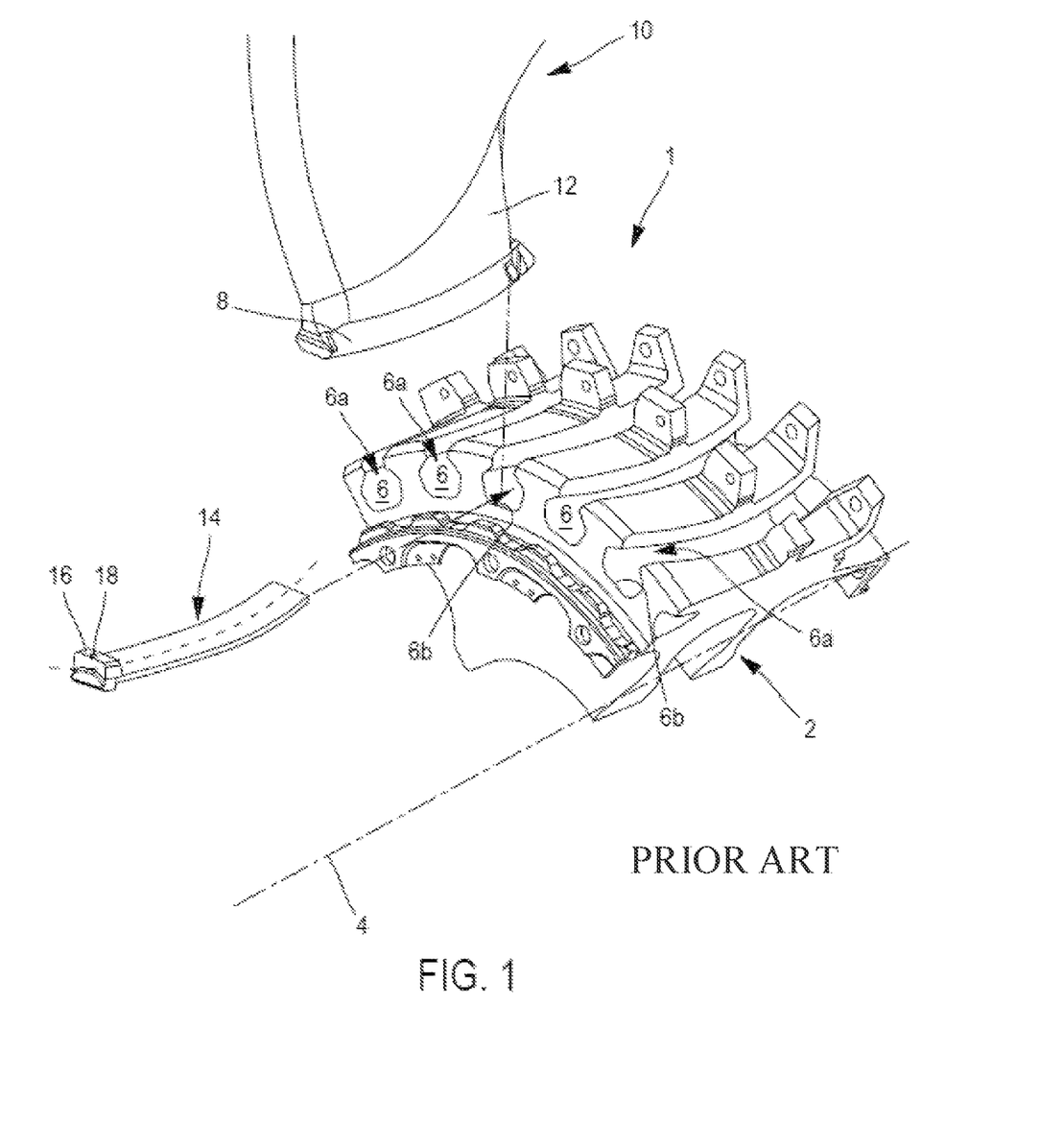
FIG. 1, previously described, is a perspective exploded view of a fan part of an aircraft turbofan engine, with a design known from the prior art.

FIG. 1 represents in an exploded view a fan 1 of a turbofan engine, such as described in patent FR2945074. The fan 1 comprises a support disk 2 capable of being rotated with respect to a fan stator part (not represented), around a longitudinal axis 4 of the fan. The support disk 2 has at its periphery a plurality of sockets 6 circumferentially spaced apart from each other. The sockets 6, in the form of grooves, extend substantially in parallel to the longitudinal axis 4 and are equidistant from the longitudinal axis 4.

Each socket 6 is intended to receive the root 8 of a fan blade 10. The root 8 is longitudinally slid in the socket 6, from one of both side faces of the disk 2. The socket 6 has an external radial end 6a enabling a neck 12 of the blade 10 to pass therethrough, which neck has a narrowed cross-section with respect to that of the root 8.

Further, for each socket 6 and corresponding blade 10, the fan 1 comprises a shim 14 interposed between the lower end of the root 8 and a bottom 6b of the socket 6. This shim 14 enables the blade 10 to be blocked in the radial direction, by pressing its root 8 against internal walls of the socket 6. The shim 14 further comprises at one of its ends an end stop 16 for axially retaining the blade 10. This end stop 16 is intended to bear against the side wall of the disk 2.

To remove a fan blade 10 from the turbofan engine, for example because it is to be repaired or replaced, it is necessary to first extract the associated shim 14. In view of the small available space around the end stop 16, it is not possible to use extraction tools, such as pliers, which would tighten the end stop 16 from the outside. Further, the strains required to extract the shim 14 from the corresponding socket 6 are too large to allow such tools to be used without damaging the shim.

An extraction hole 18 has thus been arranged in the end stop 16 of the shim 14. The shim is removed by inserting for example an Allen wrench into the hole 18, and then by pulling on the Allen wrench.

However, this type of tool is not sufficiently suitable for disassembling shims because it does not enable the shim 14 to be properly gripped, such that after it has been removed from its housing, the shim 14 can fall down and be broken or damage other components of the turbofan engine.

SUMMARY OF THE INVENTION

One purpose of the invention is to facilitate the extraction of a turbomachine shim while ensuring the shim to be properly held, so as to limit risks of damaging the shim or other components of the turbomachine.

According to a first aspect of the invention, this purpose is achieved by providing an extraction tool comprising:
  an extractor pin configured to be introduced in a through-hole of the shim;
  a first gripping member comprising a first distal end intended to be positioned facing the through-hole on a first side of the shim and arranged to hold a first end of the extractor pin; and
  a second gripping member comprising a second distal end intended to be positioned facing the through-hole of a second opposite side of the shim and arranged to hold a second opposite end of the extractor pin, after the extractor pin has been introduced into the through-hole of the shim.

The distal end of the first gripping member and the distal end of the second gripping member enable the shim to be made inseparable from the extraction tool. The shim, located around the extractor pin, is actually blocked on the one hand by the first gripping member and on the other hand by the second gripping member. The risk of the shim falling down with the extraction tool according to the invention is thus dramatically decreased with respect to the extraction tool of prior art, which only grips the shim on a single side.

Further, since the extractor pin fully passes through the shim and since its ends are firmly held by the first and second gripping members, the pulling force exerted on the tool is distributed throughout the height of the shim. The extraction procedure is thereby greatly facilitated. This also reduces the risk of damaging the shim (this avoids matting the edges of the through-hole) and breaking the extractor pin.

In a first embodiment of the extraction tool, the first and second gripping members are integral with each other so as to form a single U-shaped piece.

In a second embodiment of the extraction tool, the first and second gripping members are distinct members intended to be jointly assembled after they have been respectively positioned on either side of the shim facing the through-hole.

The extraction tool according to the invention can also have one or more of the characteristics below, considered singly or according to any technically possible combinations.

Preferably, the extractor pin is secured to the first distal end of the first gripping member.

Advantageously, the first gripping member further comprises a strain pin and the second gripping member further comprises a hole configured to receive the strain pin of the first gripping member upon assembling the first and second gripping members. This strain pin strengthens the assembly of the first and second gripping members and enables the strains to be better distributed between the first and second gripping members.

Preferably, the second gripping member further comprises a housing configured to receive the first gripping member and guide the relative movement between the first and second gripping members upon assembling the first and second gripping members.

The extraction tool advantageously comprises a safety screw enabling the assembly of the first and second gripping members to be locked. The safety screw can be mounted on the first gripping member, the second gripping member thus comprising a tap hole configured to receive the safety screw.

Preferably, the extraction tool further comprises a pulling device coupled to a proximal end of the second gripping member. This pulling device comprises for example:

a rod having a first end coupled to the proximal end of the second gripping member;
an end stop located at a second opposite end of the rod; and
an inertial mass translationally mounted on the rod.

A second aspect of the invention relates to a method for extracting a shim located in a turbomachine and provided with a through-hole. This method comprises the following steps of:
providing an extractor pin, a first gripping member comprising a first distal end arranged to hold a first end of the extractor pin, and a second gripping member comprising a second distal end arranged to block a second opposite end of the extractor pin;
positioning the first distal end of the first gripping member facing the through-hole on a first side of the shim;
positioning the second distal end of the second gripping member facing the through-hole on a second opposite side of the shim;
introducing the extractor pin into the through-hole of the shim and blocking the first and second ends of the extractor pin in the first and second distal ends respectively;
exerting a pulling force on the first and second gripping members to extract the shim.

BRIEF DESCRIPTION OF THE DRAWINGS

Further characteristics and advantages of the invention will clearly appear from the description thereof given below, by way of indicating and in no way limiting purposes, in reference to the appended drawings, in which.

For the sake of clarity, identical or similar elements bear identical reference signs throughout the figures.

DETAILED DESCRIPTION OF AT LEAST ONE EMBODIMENT

In the following description, the terms "lower" and "upper" are to be understood with respect to the orientation of the drawings.

Figure 2:
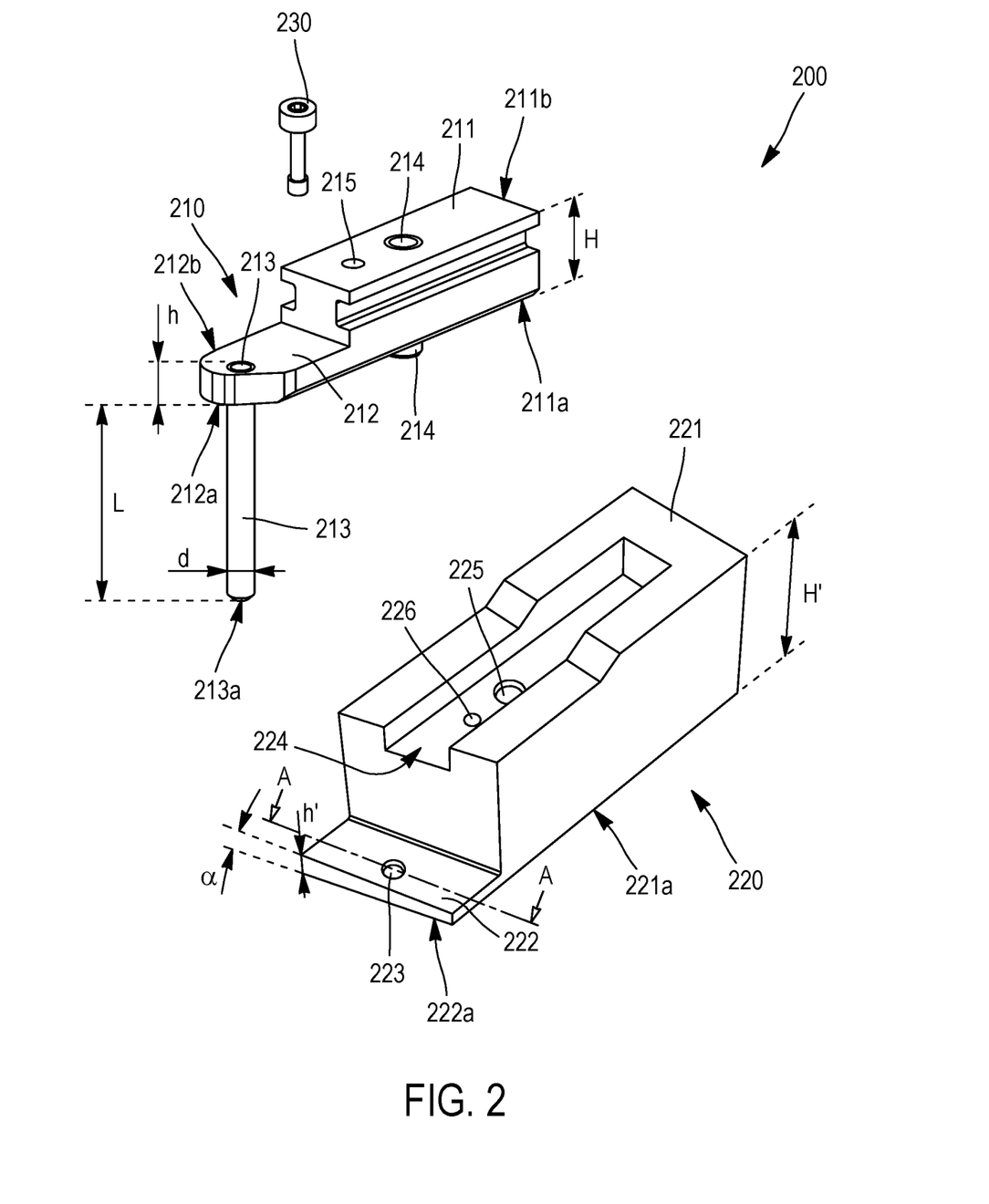
FIG. 2 represents first and second gripping members of an extraction tool, according to a preferential embodiment of the invention.

FIG. 2 represents a preferential embodiment of a tool 200 enabling a shim located in a turbomachine to be extracted, for example between a turbomachine blade and its support disk. This extraction tool 200 is in particular intended to disassemble shims, prior to disassembling the blades, in any type of turbomachine, either terrestrial or aeronautic (turbofan engine, turboprop engine, terrestrial gas turbine, etc.). By way of example, the extraction tool 200 can be used to remove the shim associated with a fan blade in a turbofan engine, such as the one represented in FIG. 1.

The extraction tool 200 comprises a first gripping member 210 and a second complementary gripping member 220. Although they are separately represented in FIG. 2, the gripping members 210 and 220 are intended to be assembled to firmly grip the end stop of the shim. The gripping members 210-220 are preferably made of metal, for example of steel.

The first gripping member 210 comprises an elongated shaped body 211 and, preferably, a head 212 in the extension of the body 211. The head 212 of the first gripping member 210 is configured to be able to be positioned on one side of the shim, and more particularly facing a through-hole arranged in the end stop of the shim. The available space around the end stop of the shim being limited, the head 212 has restricted dimensions in comparison with those of the body 211, which is more bulky. The head 212 has in particular a thickness h lower than the thickness H of the body 211. By way of example, the thickness h of the head 212 is about 3.5 mm whereas the thickness H of the body 211 is about 10 mm.

The head 212 of the first gripping member 210 is advantageously located at the same level as the base of the body 211. In other words, the lower face 212a of the head 212 and the lower face 211a of the body 211 are coplanar. The upper face 212b of the head 212 is consequently recessed with respect to the upper face 211b of the body 211.

The first gripping member 210 further comprises an extractor pin 213 anchored in the head 212. The extractor pin 213 extends through the head 212, from the upper face 212b to the lower face 212a, and then projects outside the head from its lower face 212a. The extractor pin 213 is preferably oriented perpendicular to the faces 212a-212b, which are planar and parallel. The extractor pin 213 has dimensions enabling it to fully occupy the through-hole in the end stop of the shim. Its diameter d is slightly lower than the diameter of the through-hole of the end stop and its length L is higher than the height of the end stop, such that the free end 213a of the extractor pin can protrude from the end stop when introduced there into.

In this preferential embodiment of the extraction tool, the first gripping member 210 also comprises a strain pin 214 anchored in the body 211 and preferably located approximately in the centre of the body 211. The strain pin 214 extends through the body 211 and projects outside the body, on the same side as the extractor pin 213. Like the extractor pin 213, the strain pin 214 is preferably oriented perpendicular to the lower 211a and upper 211b faces of the body 211, which are also planar and parallel. The strain pin 214 has advantageously a length lower than that of the extractor pin 213 and a diameter higher than that of the same extractor pin.

The extractor pin 213 and the strain pin 214 are preferably cylindrical rods whose the respective ends secured to the first gripping member 210 are force fitted, respectively into the head 212 and the body 211.

Finally, the first gripping member 210 can comprise a passage hole 215, intended to receive a safety screw 230 of the extraction tool 200. The safety screw 230 is preferably a captive screw. In other words, after it has been mounted on the first gripping member 210, it can no longer leave the passage hole 215.

The second gripping member 220, called "block", also comprises an elongated shaped body 221 and a head 222 in the extension of the body 221. The body 221 has the overall shape of a rectangular parallelepiped, whereas the head 222 forms an end projecting from the second gripping member 220.

The head 222 of the second gripping member 220 is configured to be able to be positioned facing the through-hole of the end stop, on the opposite side to the head 212 of the first gripping member 210. Its dimensions are thus reduced, just like the head 212 of the first gripping member 210. In particular, the head 222 is much thinner than the body 221 of the second gripping member 220. Its thickness is for example about 4 mm whereas the thickness H' of the body 221 is about 31 mm. The head 222 is advantageously located at the same level as the base of the body 221. In other words, the lower face 221a of the body 221 and the lower face 222a of the head 222 are located in the same plane.

Figure 6:
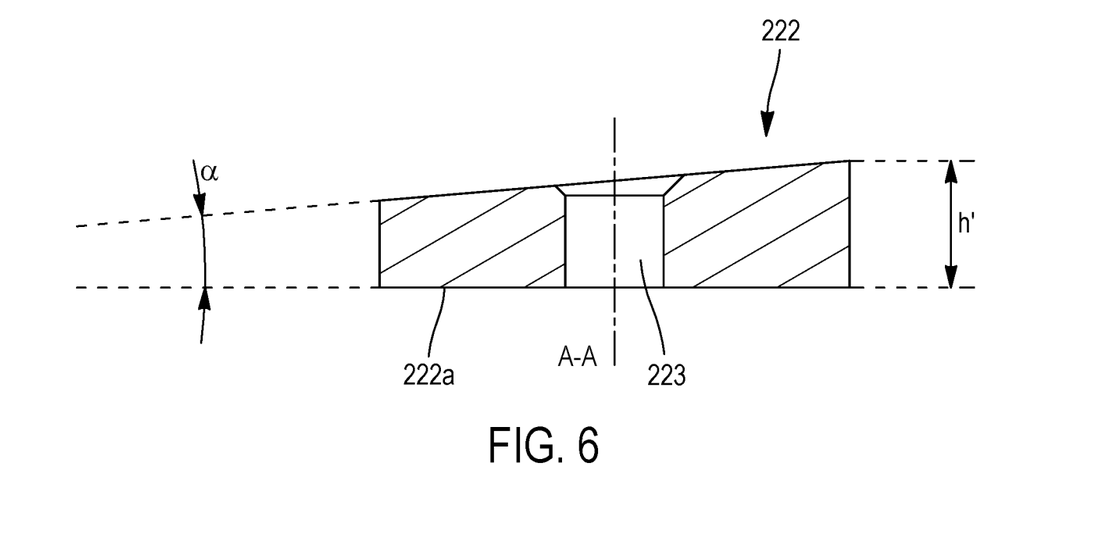
FIG. 6 is a view of the head of the second gripping member along the section plane A-A of FIG. 2.

As illustrated in detail in FIGS. 2 and 6, the thickness of the head 222 is preferably variable and decreases from a maximum thickness h' of 4 mm at an angle α of about 3° between the lower and upper faces of the head 222. The angle α enables the block 220 to be positioned under the shim 14 in the reduced space arranged between the shim and the disk 2, by contacting between the head 222 and the shim 14 (see FIG. 3).

The head 222 of the second gripping member 220 is further arranged to receive and hold the free end 213a of the extractor pin 213 belonging to the first gripping member 210. It comprises for example a first hole 223, called receiving hole, which can be a blind or through-hole. Preferably, the receiving hole 223 is a through-hole, which enables the contact area between the wall of the hole 223 and the extractor pin 213 to be increased in order to have a better distributed strain and thus decrease mechanical stresses onto the piece, in particular shearing stresses. Advantageously, the diameter of the receiving hole 223 is very slightly higher than the diameter d of the extractor pin 213. Thus, the free end 213a of the extractor pin 213 can be blocked at its periphery by the head 222 of the second gripping member 220.

In the preferential embodiment of FIG. 2, the body 221 of the second gripping member 220 also comprises a housing 224 in which the body 211 of the first gripping member 210 can be disposed. The housing 224 has a form and dimensions enabling the body 211 of the first gripping member 210 to be guided upon assembling the gripping members 210 and 220.

The shim 14, as the socket 6 provided in the support disk 2 to accommodate it, can be curved (see FIG. 1). In this case, the first gripping member 210 and the second gripping member 220 are preferably configured such that the pulling strain applied to the shim 14 is directed along the tangent to the curvature of the shim. This enables the shim to be extracted more efficiently. For that purpose, the extractor pin 213 of the first gripping member 210 is advantageously tilted at 90° with respect to the lower face 212a of the head 212 and the bottom of the housing 224 is advantageously tilted with respect to the lower face 221a of the block 220.

A second hole 225 and a third hole 226 are further provided in the body 221 of the second gripping member 220, to receive the strain pin 214 and the safety screw 230 of the first gripping member 210 respectively. The strain pin 214 and the safety screw 230 being located in the body 211 of the first gripping member 210, the second and third holes 225-226 are provided with an appropriate depth and open into the housing 224.

The portions projecting from the extractor pin 213 and from the strain pin 214 having no threads, the receiving hole 223 of the extractor pin 213 and the second hole 225 associated with the strain pin 214 are not tapped, unlike the third hole 226 receiving the safety screw 230.

Figure 3:
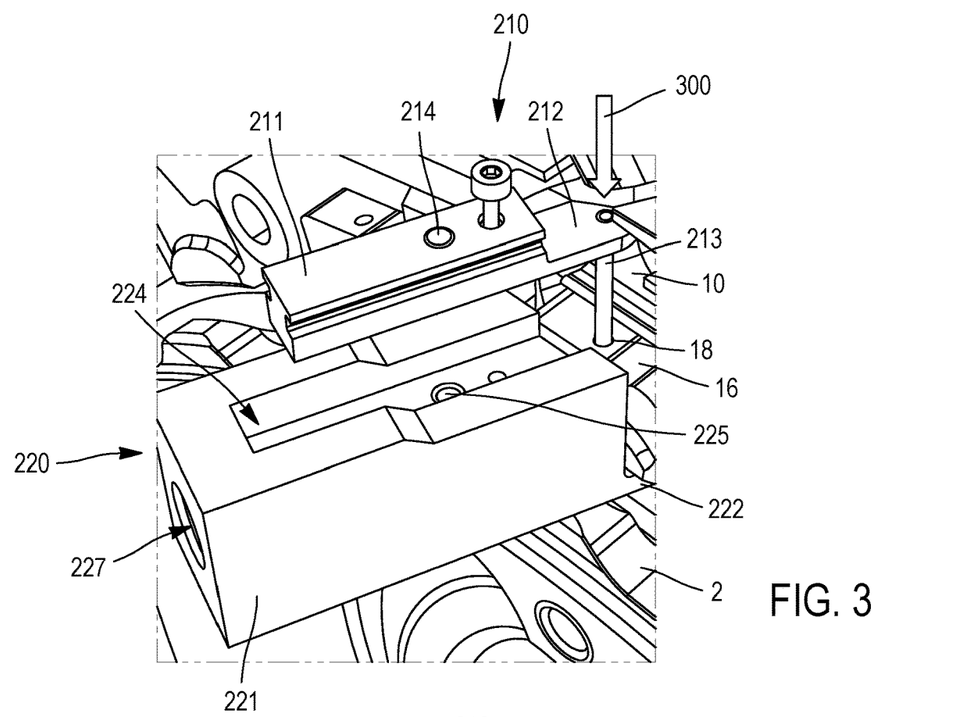
FIG. 3 is a perspective view of the extraction tool of FIG. 2, when mounted on a turbofan engine shim.
Figure 4:
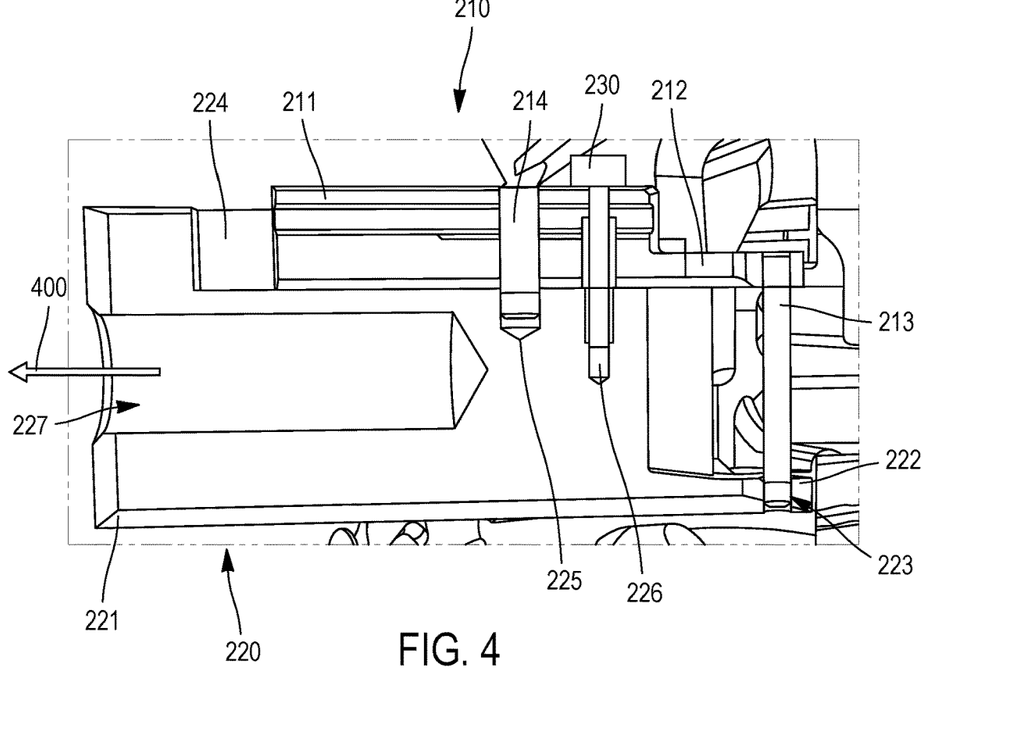
FIG. 4 is a cross-section view of the extraction tool of FIG. 2, when mounted and assembled on the turbofan engine shim.

FIGS. 3 and 4 are views of the extraction tool 200, in a perspective view and a transverse cross-section view respectively, which illustrate steps of the procedure for extracting a shim. The shim is herein located between a fan blade 10 and its support disk 2, in a turbofan engine. As described in connection with FIG. 1, this shim comprises an end stop 16 through which a hole 18 passes.

Firstly, the heads 212 and 222 respectively located at the distal ends of the first and second gripping members 210 and 220 are positioned on either side of the end stop 16. Preferably, the head 212 of the first gripping member 210, equipped with the extractor pin 213, is positioned on the side of the end stop 16 oriented radially outwardly of the support disk 2, that is on the side of the blade 10. The head 222 of the second gripping member 220 is thereby positioned on the opposite side, oriented to the centre of the disk 2.

The first gripping member 210 is positioned so as to bring the extractor pin 213 directly above the through-hole 18 of the shim 14. Then, the first gripping member 210 is moved towards the second gripping member 220, which can be stationary. This results in sliding the extractor pin 213 inside the through-hole 18, as indicated by the arrow 300.

At the end of the movement of the first gripping member 210, the body 211 thereof can be guided by the side walls of the housing 224, until the lower face 211a of the body 211 contacts the bottom of the housing 224. This guiding can require a prior adjustment of the position of the second gripping member 220 with respect to the first gripping member 210, so as to center the body 211 with respect to the housing 224. The housing 224 further enables the strain pin 214 to be more readily brought directly above the second hole 225, because sliding the body 211 in the housing 224 is then sufficient. The housing 224 thereby largely facilitates the relative positioning of the first and second gripping members 210-220 and the assembly thereof.

The movement of the body 211 in the housing 224 so as to position the strain pin 214 in the second hole 225 enables the receiving hole 223 of the second gripping member 210 to be aligned with the through-hole 18 and the extractor pin 213 located inside. The arrangement of the extractor pin 213 and the strain pin 214 is such that the free end of the extractor pin 213 passes through the hole 18 of the shim 14, and thereafter, the strain pin 214 gets positioned in the second hole 225, before the extractor pin 213 is positioned in the receiving hole 223.

To perform the assembling of the gripping members 210 and 220, it is also possible to push first the extractor pin 213 in the through-hole 18 of the end stop 16 (according to the circumferential position of the blade, the first gripping member 210 remains on the shim without assistance), and then to bring the head 222 of the second gripping member 220 facing the through-hole 18. Guiding between both pieces can also be used in this case.

In the cross-section view of FIG. 4, the configuration of the gripping members 210 and 220 has been represented once assembled. The body 211 of the first gripping member 210 mostly occupies the housing 224 of the second gripping member 220. The end projecting from the strain pin 214 occupies the second hole 225. The extractor pin 213, surrounded by the end stop 16, is secured to the head 212 of the first gripping member 210 at one of its ends and held by the head 222 of the second gripping member 220 at the other of its ends.

The first and second gripping members 210 and 220 can be manually positioned and assembled by an operator. The first gripping member 210 is held by the body 211 in one hand, whereas the second gripping member 220 is held by the body 220 in the other hand. Thanks to the fact that the weight and bulk of the gripping members 210 and 220 are small, this handling is easy, even in a space as reduced as that of a turbofan engine.

After the gripping members 210 and 220 have been assembled, the safety screw 230 is advantageously screwed in the third hole 226 of the second gripping member 220. This enables the assembly of the first and second gripping members 210 and 220 to be locked. Thus, the gripping members are inseparable from each other and from the shim, still in position between the fan blade 10 and the support disk 2. Consequently, they cannot fall down into the turbofan engine.

Further, thanks to the housing 224 arranged in the second gripping member 220, the extraction tool is particularly compact in the assembled configuration. The risk of the tool abutting against neighbouring elements of the turbofan engine upon extracting the shim is consequently decreased.

Finally, extracting the shim is performed by exerting a pulling force 400 (see FIG. 4) on any of the gripping members 210-220. As the end stop of the shim has become inseparable from the assembly of the gripping members 210-220, it cannot fall down on its own in the turbofan engine, which limits damage risks in the turbofan engine.

The pulling force 400 is advantageously exerted from the proximal end of the second gripping member 220. As can be seen in FIGS. 3 and 4, the proximal end of the second member 220 can be arranged to couple a pulling device therein. The body 221 can in particular comprise a tap hole 227. The blind tap hole 227 extends in the body 221 from the proximal end of the second gripping member 220.

Thanks to the strain pin 214 and the corresponding second hole 225, the assembly of the first and second gripping members 210-220 does not only rely on the coupling between the extractor pin 213 and the head 220. Thus, when the pulling force 400 is exerted, the strains between both gripping members are better distributed, which decreases risks of deterioration of the head 220 of the second gripping member 220 as well as of the extractor pin 213.

Figure 5:
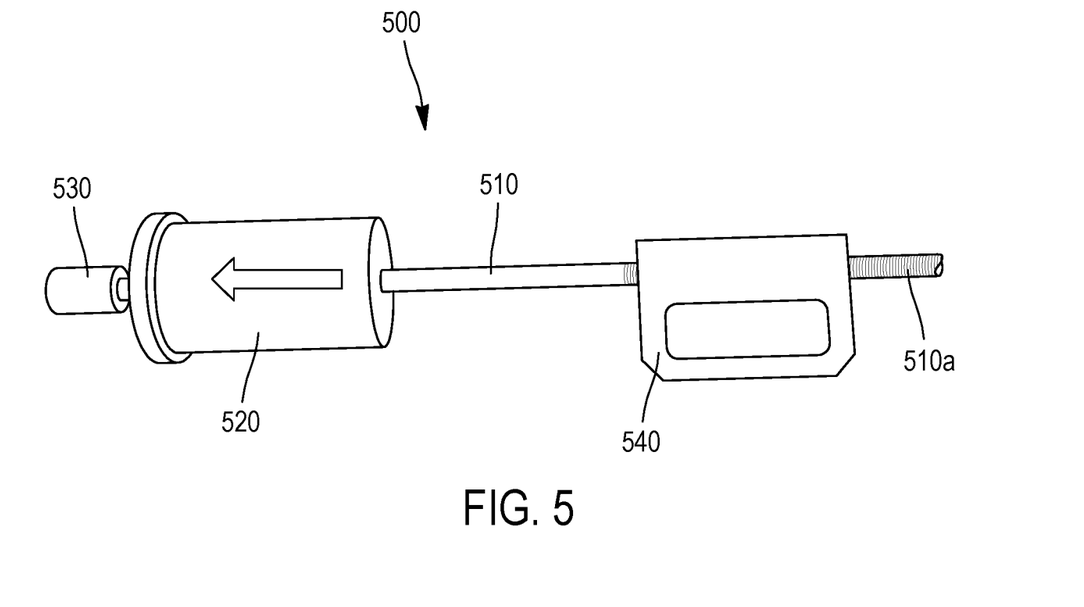
FIG. 5 represents an embodiment of a pulling device for exerting a pulling force onto the extraction tool.

FIG. 5 represents an embodiment 500 of the pulling device enabling the pulling force 400 to be exerted on the second gripping member 220. The pulling device 500 comprises a rod 510, preferably a cylindrical one, and an inertial mass 520 movably mounted on the rod 510. The distal end 510a of the rod 510 is configured to be coupled to the proximal end of the second gripping member 220. The distal end 510a of the rod 510 has, for example, a threading, such that the rod can be screwed in the tap hole 227 of the second gripping member 220. At the proximal end of the rod 510, the pulling device 500 further comprises an end stop 530 for retaining the inertial mass 520. The end stop 530 can be attached to the proximal end of the rod 500, for example by means of a pin, or be formed in a single piece with the rod 510.

To extract the shim 14 using this device 500, the inertial mass 520 is translationally moved along the rod, towards the end stop 530. The pulling force is generated when the inertial mass 520 strikes the end stop 530.

The pulling device 500 can be fully made of metal, for example of steel. It is advantageously equipped with a handle 540 to facilitate its use and, beforehand, its installation onto the second gripping member 220. The handle 540 is attached to the rod 510, preferably between the end 510a and the inertial mass 520. Generally, the handle 540 enables the device 500 to be transported and also, to be held during the impact of the inertial mass 520 against the end stop 530.

Thus, the pulling device 500 enables the force necessary for extracting the shim to be generated readily, simply by throwing the inertial mass 520 against the end stop 530. Therefore, with the gripping members 210-200 it forms a shim extracting tool which is particularly simple to use.

Of course, the invention is not limited to the preferential embodiment that has been described in reference to FIGS. 2 to 5 and many variants of the extraction tool will become apparent to those skilled in the art. In particular, the extractor pin and the strain pin can be differently distributed. Both pins can especially be distributed between both gripping members, for example by providing the second gripping member 220 (rather than the first gripping member 210) with the strain pin 214. The strain pin 214 would thereby be located inside the housing 224 and the lower face of the first gripping member 210 would have the second hole 225. It is also envisaged to reverse the roles of the first and second gripping members, for example by exchanging both heads 212 and 222.

Finally, in a simplified embodiment, the extraction tool can comprise a single U-shaped gripping member (rather than two L-shaped members), whose the free branches are secured and intended to receive the opposite ends of an extractor pin in appropriately arranged receiving holes. In other words, the first and second gripping members 210-220 form a single piece which will grip the extractor pin on either side of the shim. The extractor pin is thus, in this simplified embodiment, separated from the gripping member. Both branches of the U-shaped member are positioned on either side of the end stop of the shim. Thus, the shim occupies the space between both branches. Then, the receiving holes arranged at the distal ends of the branches are substantially aligned with the through-hole of the shim, before the extractor pin is introduced in the end stop of the shim and is blocked in each U-branch.

The invention claimed is:

1. An extraction tool for extracting a shim located in a turbomachine and provided with a through-hole, comprising:
   an extractor pin configured to be introduced in the through-hole of the shim, the extractor pin comprising a first end and a second opposite end;
   a first gripping member comprising a first distal end configured to be positioned facing the through-hole on a first side of the shim and adapted to hold the first end of the extractor pin; and
   a second gripping member comprising a second distal end configured to be positioned facing the through-hole on a second opposite side of the shim, the second distal end comprising a first hole adapted to receive and hold the second opposite end of the extractor pin after the extractor pin has been introduced into the through-hole of the shim,
   wherein the first and second gripping members are distinct members intended to be jointly assembled after the first and second gripping members have been respectively positioned on either side of the shim facing the through-hole, and
   wherein the second gripping member further comprises a housing configured to moveably receive the first gripping member and guide a relative movement between the first and second gripping members and along a direction that extends between the first and second distal ends upon assembling the first and second gripping members.

2. The extraction tool according to claim 1, wherein the extractor pin is secured to the first distal end of the first gripping member.

3. The extraction tool according to claim 1, wherein the first gripping member further comprises a strain pin and wherein the second gripping member further comprises a second hole configured to receive the strain pin of the first gripping member upon assembling the first and second gripping members.

4. The extraction tool according to claim 1, further comprising a safety screw enabling the assembly of the first and second gripping members to be locked.

5. The extraction tool according to claim 4, wherein the safety screw is mounted on the first gripping member, the second gripping member comprising a tap hole configured to receive the safety screw.

6. The extraction tool according to claim 1, further comprising a pulling device coupled to a proximal end of the second gripping member.

7. The extraction tool according to claim 6, wherein the pulling device comprises:
    a rod having a first end coupled to the proximal end of the second gripping member;
    an end stop located at a second opposite end of the rod; and
    an inertial mass translationally mounted on the rod.

8. The extraction tool according to claim 1, wherein the first gripping member has a width smaller than a width of the second gripping member.

9. The extraction tool according to claim 1, wherein the first end of the extractor pin is anchored to the first distal end to prevent any relative movement between the extractor pin and the first gripping member.

10. The extraction tool according to claim 1, wherein the first hole is a through-hole.

11. A method for extracting a shim located in a turbomachine and provided with a through-hole, comprises:
    providing an extractor pin comprising a first end and a second opposite end, a first gripping member comprising a first distal end adapted to hold the first end of the extractor pin, and a second gripping member comprising a second distal end, the second distal end comprising a first hole adapted to receive and hold the second opposite end of the extractor pin;
    positioning the first distal end of the first gripping member facing the through-hole on a first side of the shim;
    positioning the second distal end of the second gripping member facing the through-hole on a second opposite side of the shim;
    introducing the extractor pin into the through-hole of the shim and blocking the first and second ends of the extractor pin in the first and second distal ends respectively;
    exerting a pulling force on the first and second gripping members to extract the shim,
    wherein the first and second gripping members are distinct members jointly assembled after the first and second gripping members have been respectively positioned on either side of the shim facing the through-hole, and
    wherein the second gripping member further comprises a housing moveably receiving the first gripping member and guiding a relative movement between the first and second gripping members and along a direction that extends between the first and second distal ends upon assembling the first and second gripping members.

* * * * *